US011021190B2

(12) United States Patent
Wietharn et al.

(10) Patent No.: US 11,021,190 B2
(45) Date of Patent: Jun. 1, 2021

(54) SUSPENSION SYSTEM FOR A VEHICLE (71) Applicant: Caterpillar Inc., Peoria, IL (US)

(72) Inventors: Ross P. Wietharn, Peoria, IL (US);
Julian Lowerson, Lincolnshire (GB);
Joel Kenneth Cadbury-Allen,
Hartlepool (GB); Simon J. Gould,
Darlington (GB); Mark Robinson,
County Durham (GB)

(73) Assignee: Caterpillar Inc., Peoria, IL (US)

( * ) Notice: Subject to any disclaimer, the term of this patent is extended or adjusted under 35 U.S.C. 154(b) by 36 days.

(21) Appl. No.: 16/661,753

(22) Filed: Oct. 23, 2019

(65) Prior Publication Data
US 2021/0122424 A1 Apr. 29, 2021

(51) Int. Cl.
B62D 21/20 (2006.01)
B62D 21/15 (2006.01)
(Continued)

(52) U.S. Cl.
CPC ............. B62D 21/20 (2013.01); B60G 1/04 (2013.01); B62D 21/152 (2013.01); B62D 24/04 (2013.01)

(58) Field of Classification Search
CPC ...... B62D 21/20; B62D 24/04; B62D 21/152; B60G 1/04; B60G 2200/31;
(Continued)

(56) References Cited

U.S. PATENT DOCUMENTS 5,490,755 A * 2/1996 Billotte ................. B60K 17/14
180/24.03
7,201,367 B2 4/2007 Wietharn
(Continued)

FOREIGN PATENT DOCUMENTS

CN 201300761 Y 9/2009
CN 102653222 A 9/2012
(Continued)

OTHER PUBLICATIONS

Extended European Search Report related to Application No. 20198255.0 dated Mar. 10, 2021.

Primary Examiner — Paul N Dickson
Assistant Examiner — Daniel M. Keck
(74) Attorney, Agent, or Firm — von Briesen & Roper, s.c.

(57) ABSTRACT

A vehicle includes a trailer assembly supported by a rear chassis system. The rear chassis system includes a chassis frame having at least two longitudinal chassis members. The rear chassis system includes a rear suspension frame coupled to a back rear axle. The rear suspension frame includes a bearing head with a bearing aperture. Equalizing beams extend between the front rear axle and the back rear axle, with each equalizing beam including a bushing aperture. The rear chassis system also includes a plurality of suspension mounts. To minimize relative translations experienced by the suspension mounts during operation of the vehicle, opposing end sections of a spindle cross member, along with the bearing aperture and the bushing aperture are coaxially aligned. Likewise, the opposing spindle end sections, the bearing aperture, the bushing aperture, and a top plate of each suspension mount are coplanar.

20 Claims, 6 Drawing Sheets (51) Int. Cl.
*B62D 24/04* (2006.01)
*B60G 1/04* (2006.01)

(58) Field of Classification Search
CPC ........ B60G 2200/312; B60G 2200/343; B60G 2200/344; B60G 2200/345; B60G 2204/16; B60G 2204/22
See application file for complete search history.

(56) References Cited

U.S. PATENT DOCUMENTS

| | | |
|---|---|---|
| 8,070,143 B2 | 12/2011 | Wietharn |
| 2006/0170205 A1* | 8/2006 | Ramsey ............... B62D 27/023 |
| | | 280/789 |
| 2012/0119464 A1 | 5/2012 | Moriyama et al. |
| 2020/0156427 A1* | 5/2020 | Schutt .................... B60G 9/003 |
| 2020/0247490 A1* | 8/2020 | Leines .................... B62D 21/20 |
| 2020/0346701 A1* | 11/2020 | Allegretti ................. B60P 3/00 |

FOREIGN PATENT DOCUMENTS

| | | | | |
|---|---|---|---|---|
| CN | 107097602 A | * | 8/2017 | |
| CN | 107215159 A | | 9/2017 | |
| CN | 107554226 A | | 1/2018 | |
| CN | 206870777 U | | 1/2018 | |
| CN | 107963132 A | | 4/2018 | |
| DE | 202012009294 U1 | * | 1/2014 | ............. B60P 1/483 |
| EP | 2275289 A1 | | 1/2011 | |
| GB | 2351952 A | * | 1/2001 | ............. B60G 9/00 |
| WO | 9904991 A1 | | 2/1999 | |

\* cited by examiner

SUSPENSION SYSTEM FOR A VEHICLE

TECHNICAL FIELD

The present disclosure relates generally to suspension systems, and, more specifically, to a suspension system for a vehicle.

BACKGROUND

Vehicle suspensions, and in particular suspension mounts, carry high loads and withstand large deflections to enable a rear suspension to navigate uneven terrain. Suspension mounts are designed to carry compressive and tensile loads, while at the same time allowing the two vehicle components to translate and tilt relative to one another. However, the combination of heavy loads and large deflections provide challenging operating conditions for suspension mounts to endure. In addition, current suspension systems are not optimized to protect or prolong the life of the suspension mounts. Extreme motion within the suspension system, including large translations and rotations of mounting plates relative to one another, leads to suspension mount damage and reduced life.

Articulated vehicles may be particularly susceptible to suspension mount degradation. Articulated vehicles typically comprise at least two frames connected by one or more articulation or pivot joints. The articulation joint enables the frames to roll relative to one another and helps to reduce the vehicle's turning radius. Some of the most common examples of articulated vehicles include transportation vehicles like buses and trains, and work machines such as loaders, graders, and dump trucks. Articulated work machines are generally employed in construction and excavation environments, and are often used for transporting a loose load, for example, soil, rocks, gravel, garbage and the like from one location to another. Often, the path over which the articulated work machine must travel may vary in stability, composition, terrain and grade.

Prior attempts to improve vehicle suspension systems have been directed to various arrangements to reduce production cost and materials for reducing system weight. For example, Chinese Patent Pub. No. CN102653222A discloses a dump truck suspension system that utilizes a balance shaft, positioned between a pair of rigid balance beams. The balance shaft is in rigid connection with a frame, and is specifically made from a material that is both lightweight and cost efficient. The suspension system also includes two axles, with each axle having two rubber springs. The balance beams sit atop two rubber springs, one on each axle, thereby connecting the two axles.

While utilizing a more resilient suspension mount in a vehicle can help to prolong the life of the suspension mount, current suspension system component arrangements still impart extreme motions to the suspension mounts. There is consequently a need to improve the suspension systems to minimize the relative motions experienced by the suspension mounts.

SUMMARY

In accordance with one aspect of the present disclosure, a rear chassis for a vehicle is disclosed. The rear chassis may comprise a chassis frame including at least two longitudinal chassis members. The rear chassis may also include a plurality of axles, including a front rear axle and a back rear axle. A suspension frame may be coupled to the back rear axle, and may include a bearing head having a bearing head aperture. Extending between the front rear axle and the back rear axle may be a pair of equalizing beams. Each equalizing beam may include a bushing aperture. The rear chassis may also include a spindle cross member having a middle section and opposing end sections. The bearing head aperture, the bushing apertures, and the spindle end sections may be coaxially aligned to define a spindle axis.

In accordance with another aspect of the present disclosure, a rear chassis for a vehicle is disclosed. The rear chassis may comprise a chassis frame including at least two longitudinal chassis members. The rear chassis may also include a plurality of axles, including a front rear axle and a back rear axle. A suspension frame may be coupled to the back rear axle and may include a bearing head having a bearing head aperture. Extending between the front rear axle and the back rear axle may be a pair of equalizing beams. Each equalizing beam may include a bushing aperture. The rear chassis may also include a spindle cross member having a middle section and opposing end sections. Finally, the rear chassis may include a plurality of suspension mounts. Each suspension mount may have a top plate and a bottom plate, with a resilient material extending between the top plate and the bottom plate. The bearing head aperture, the bushing apertures, the spindle end sections, and the top plate of each suspension mount may be coplanar.

In accordance with yet another aspect of the present disclosure, a vehicle is disclosed. The vehicle may include an engine assembly, a trailer and an articulation joint. The engine assembly may be supported by a front chassis and include an engine and an operator cab. The trailer assembly may be supported by a rear chassis. The articulation joint may pivotably connect the front chassis and the rear chassis. The rear chassis may include a front suspension frame coupled to a front rear axle and a rear suspension frame coupled to the back rear axle. The front suspension frame may include a front bearing head operatively coupled to the articulation joint, and the rear suspension frame may include a rear bearing head having a rear bearing head aperture. The rear chassis may also include a chassis frame including at least two longitudinal chassis members. The rear chassis may also include a spindle cross member having a middle section and opposing end sections. Extending between the front rear axle and the back rear axle may be a pair of equalizing beams. Each equalizing beam may include a bushing aperture. The rear chassis may further include a plurality of suspension mounts. Each suspension mount may have a top plate and a bottom plate, and a resilient material extending between the top plate and the bottom plate. The rear bearing head aperture, the bushing apertures, and the spindle end sections may be coaxially aligned to define a spindle axis. Likewise, the rear bearing head aperture, the bushing apertures, the spindle end sections, and the top suspension mount plates may be coplanar.

These and other aspects and features of the present disclosure will be better understood upon reading the following detailed description, when taken in conjunction with the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
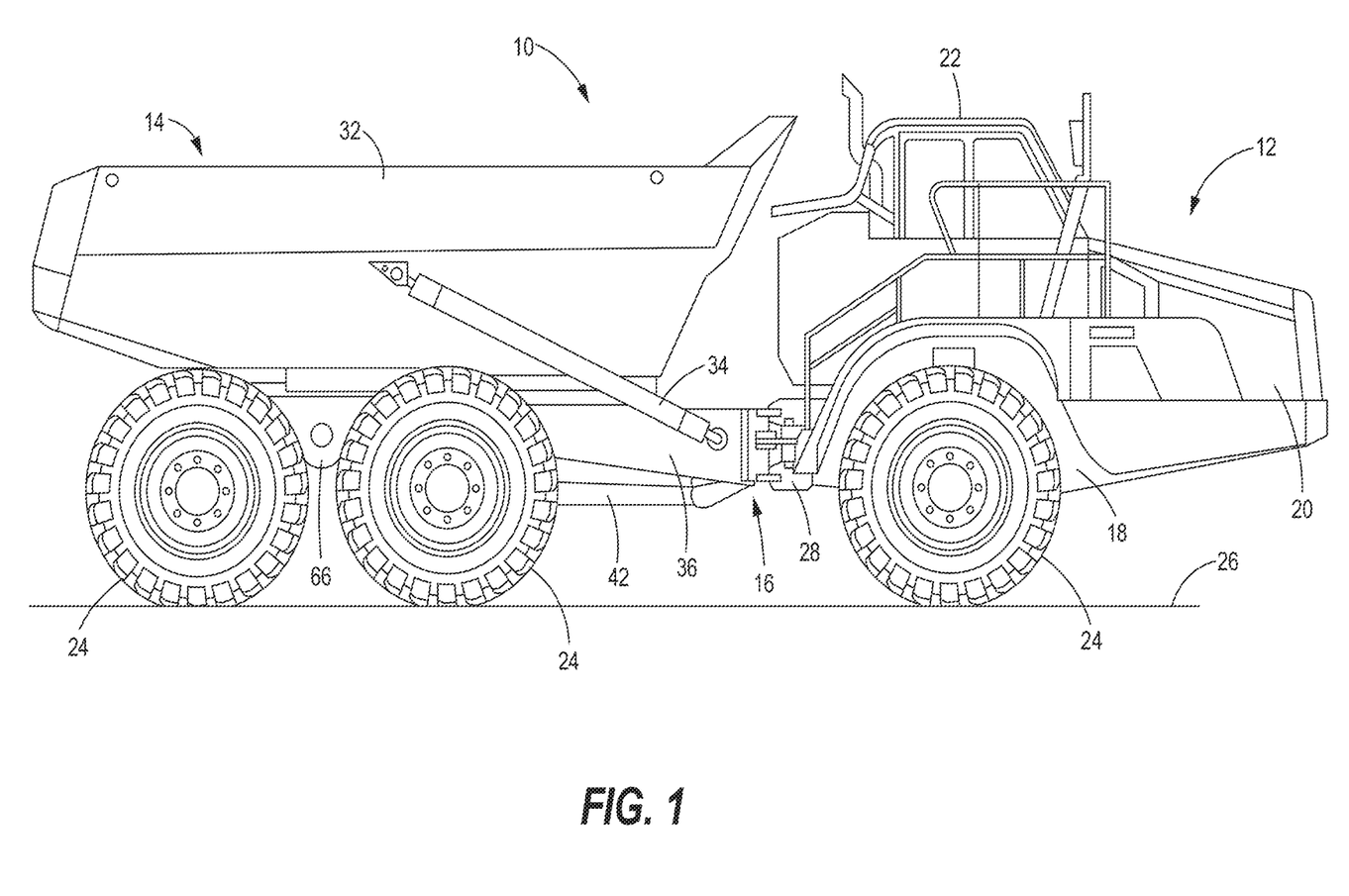
FIG. 1 is a side perspective view of a work machine having a rear chassis system constructed in accordance with the present invention.

FIG. 1 illustrates a side perspective view of a vehicle, or more specifically, an articulated work machine 10, according to an embodiment of the present disclosure. The exemplary work machine 10 may be an articulated vehicle such as a loader, grader, or dump truck, although the features disclosed herein may be utilized with other types of vehicles such as transportation or commercial vehicles, other work machines, and the like, regardless of the type of work performed by the machine. The term "machine" includes vehicles or machines. The work machine 10 generally includes an engine assembly 12 and a trailer assembly 14 that may be pivotably connected at an articulation joint 16 via a coupling assembly 28. The coupling assembly 28 may allow the engine assembly 12 and trailer assembly 14 to be oriented at varying pitch, yaw and/or roll angles, relative to each other.

The engine assembly 12 may be supported by a front chassis system 18 and may include an engine compartment 20 and an operator cab 22. The engine compartment 20 may house an engine (not shown), and other machine components. A front axle (not shown) may be provided to support the engine assembly 12, and may include one or more ground engaging means 24, such as wheels, mounted at either end of the front axle. The ground engaging means 24 may provide support as the work machine 10 travels over terrain 26. While the work machine 10 is illustrated with a single front axle, the present rear chassis system (FIG. 2) is compatible with a work machine having multiple front axles and multiple ground engaging means 24 mounted to each front axle. Similarly, the ground engaging means may be of any suitable type, such as wheels or tracks. As used herein, a "front" position refers to a forward position on the work machine 10 with respect to a forward direction of travel, while a "rear" position or "back" position refers to a rearward position on the work machine with respect to the direction of travel.

The trailer assembly 14 may be supported by a rear chassis system 30 (FIG. 2) and may include a body 32 adapted to carry a load, such as a dump or ejector body. The body 32 may be pivotably connected to the rear chassis system 30 at a pivot point (not shown). During operation, the body 32 may be raised or lowered with respect to the rear chassis system 30 by at least one hydraulic actuator 34. In the raised position, one end of the body 32 is raised from the rear chassis system 30, while the other end remains connected to the rear chassis system at the pivot point, thereby ejecting any material or payload out of the body.

Figure 2:
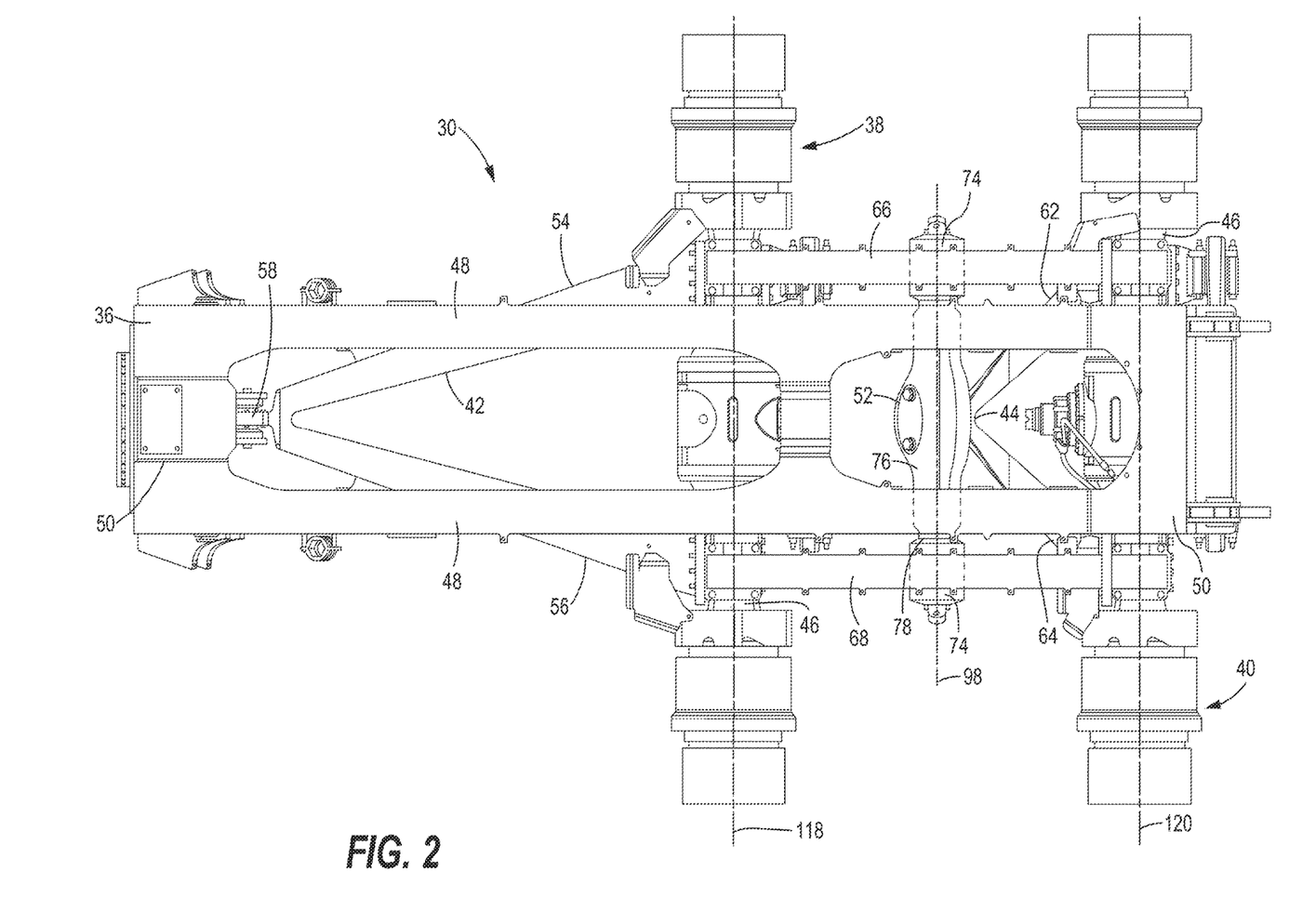
FIG. 2 is a top view of a rear chassis system constructed in accordance with an embodiment of the present invention.

FIG. 2 illustrates an exemplary arrangement of the rear chassis system 30 of the work machine 10, constructed according to an embodiment of the present disclosure. The rear chassis system 30 may utilize a tandem axle arrangement with two axles, namely a front rear axle 38 and a back rear axle 40. The rear chassis system 30 may have more than two axles, however, for the purposes of this embodiment, only two axles will be referred to. Ground engaging means 24 (FIG. 1) may be mounted at each end of the front rear axle 38 and the back rear axle 40 of the rear chassis system 30. The front rear axle 38 and back rear axle 40 may each include a rigid axle shaft 46 that extends between the ground engaging means 24 arranged at opposing ends of each axle.

The front rear axle 38 and back rear axle 40 may be attached to a rigid chassis frame 36 by a front suspension frame 42 and a back suspension frame 44. The chassis frame 36 may be formed from a pair of parallel longitudinal beams 48 and a plurality of lateral cross members 50 that may be attached to, and extend between, the pair of longitudinal members. The chassis frame 36 may also include a spindle cross member 52, which may act to stiffen the chassis frame. The longitudinal beams 48 and the lateral cross members 50 may be formed from a rigid material such as a metal or a metallic alloy (e.g. steel). The front suspension frame 42 may extend between the front rear axle 38 and the lateral cross member 50 located proximate the articulation joint 16. Similarly, the back suspension frame 44 may extend between the back rear axle 40 and the spindle cross member 52.

The front suspension frame 42 and the back suspension frame 44 may be configured as A-frames, with each suspension frame including a plurality of arms. More specifically, the front suspension frame 42 may include a first front arm 54, a second front arm 56 and a front bearing head 58. The first front arm 54 and second front arm 56 of the front suspension frame 42 may be joined together at the front bearing head 58, which may pivotably attach to the lateral cross member 50 proximate the articulation joint 16. The first and second front arms 54, 56 may extend rearwardly and outwardly from the front bearing head 58 at an angle. Opposite the front bearing head 58, both the first front arm 54 and the second front arm 56 may be coupled to the front rear axle 38. The back suspension frame 44, on the other hand, may include a first back arm 62, a second back arm 64 and a back bearing head 60. The first back arm 62 and second back arm 64 of the back suspension frame 44 may be joined together at the back bearing head 60, which may pivotably attach to the spindle cross member 52. The first and second back arms 62, 64 may extend rearwardly and outwardly from the back bearing head 60 at an angle. Opposite the back bearing head 60, both the first back arm 62 and the second back arm 64 may be coupled to the back rear axle 40.

As illustrated in FIGS. 2 through 5, a first equalizing beam 66 may be coupled to, and extend between, the front rear axle 38 and the back rear axle 40 on one side of the chassis frame 36. A second equalizing beam 68 may be coupled to, and extend between, the front rear axle 38 and the back rear axle 40 on a laterally opposite side of the chassis frame 36. The first equalizing beam 66 and second equalizing beam 68 may each have a central body region 70 including an aperture 72 that extends laterally through the central body region. Positioned within each aperture 72 may be at least one bushing 74. As illustrated, each aperture 72 may include two bushings. The bushings 74 may be conical in shape and may be made of an elastomeric material, such as rubber. Similarly, the bushings 74 may be assembled onto an end section 78 of the spindle cross member 52 and secured in each aperture 72 by a spindle cross member cap (not shown) bolted into an end 63 of the spindle cross member. During operation, the conical shape and elastomeric material enable the first equalizing beam 66 and the second equalizing beam 68 to rotate relative to chassis frame 36.

Figure 3:
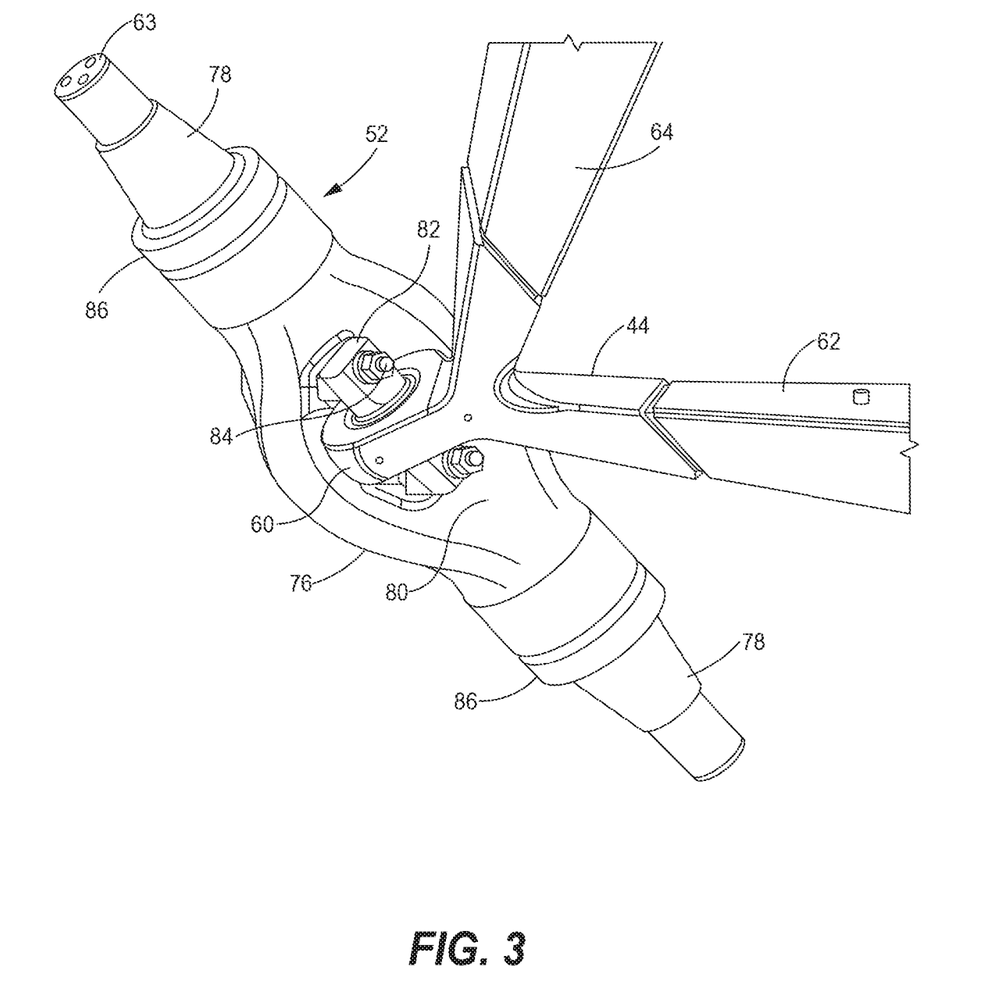
FIG. 3 is a perspective view of a section of the underside of a portion of a rear chassis system constructed in accordance with an embodiment of the present invention.

Referring now to FIG. 3, with continued reference to FIG. 2, the first equalizing beam 66 and the second equalizing beam 68 may be connected by the spindle cross member 52. The spindle cross member 52 may include a middle section 76 and a pair of end sections 78 located at opposing ends of the spindle cross member. The middle section 76 may be steel, the shape formed by a casting process. The end sections 78, however, may be forged, for example from boron steel, which is then hardened. Manufacturing the middle section 76 and end sections 78 using different materials and different manufacturing processes may allow an optimum construction in terms of balancing component strength in the areas subjected to the highest stresses against manufacturing costs. However, it is also contemplated that the spindle cross member 52 may be manufactured as a single component.

The middle section 76 of the spindle cross member 52 may define a central cavity 80 having a generally bowl-like shape to house the back bearing head 60. For example, the central cavity 80 may be C-shaped, U-shaped, hemispherical, or in the form of dome or an elongate parabolic dome; however, other shapes and arrangements are also contemplated. The back bearing head 60 may be pivotably attached to the spindle cross member 52 by means of a straddle bearing 82. The straddle bearing 82 may be installed, for example, by friction fit, into a bearing aperture 61 (FIG. 4) formed in the back bearing head 60. While the straddle bearing 82 is illustrated, a spherical plain bearing may also be used. The straddle bearing 82 may be attached to the spindle cross member 52 by means of a plurality of fasteners 84, such as bolts.

Figure 4:
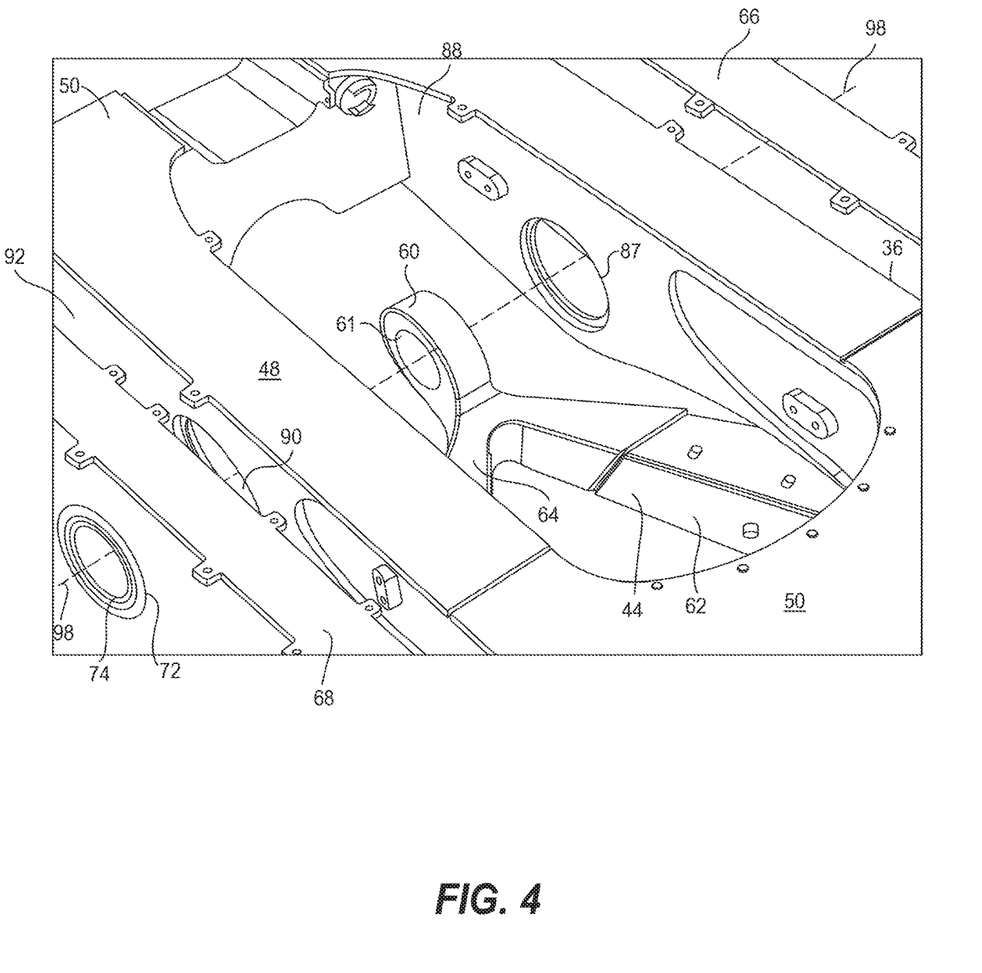
FIG. 4 is a side elevation view of a portion of a rear chassis system constructed in accordance with an embodiment of the present invention.

Referring now to FIG. 4, with continued reference to FIG. 3, the spindle cross member 52 may be fastened to the chassis frame 36, for example, by welding. More specifically, upon installation, the spindle cross member 52 may extend laterally through a plurality of apertures 87, 90 in the longitudinal beams 48 of the chassis frame 36. Each longitudinal beam 48 may include both an interior aperture 87 cut into an interior wall 88 of each beam, as well as an exterior aperture 90 cut into an exterior wall 92 of each beam, each aperture dimensioned to accommodate the spindle cross member 52. Once inserted through the interior apertures 87 and the exterior apertures 90 of each longitudinal beam 48, the spindle cross member 52 may be secured in position. For example, the middle section 76 of the spindle cross member 52 may be welded to at least the interior apertures 87 of each longitudinal beam 48, while a cylindrical welding portion 86 of the spindle cross member may be welded to at least the exterior apertures 90 of each beam. Further, each end section 78 of the spindle cross member 52 may include one or more bushings 74, and may extend through one of the equalizing beam apertures 72. The bushings 74 may be secured to each end section 78 of the spindle cross member 52 by a spindle cap (not shown), which may be bolted into the end 63 of each end section. In this arrangement, the spindle cross member 52, the bushings 74, and the back bearing head 60 may be coaxially aligned. More specifically, a spindle axis 98 may be defined between the radial center of each end section 78 of the spindle cross member 52, thereby also extending through each bushing 74, each equalizing beam aperture 72, and through the bearing aperture 61. The spindle axis 98 may also extend through the exterior apertures 90 and the interior apertures 87, as shown in FIGS. 1-6 herein, however, the exact arrangement, position, size and shape of the exterior and interior apertures may vary. Further, the spindle axis 98 may parallel, or substantially parallel, two axle axes 118, 120 defined by the front rear axle 38 and the back rear axle 40, respectively, while the work machine is in a neutral state (i.e. on flat ground).

Figure 5:
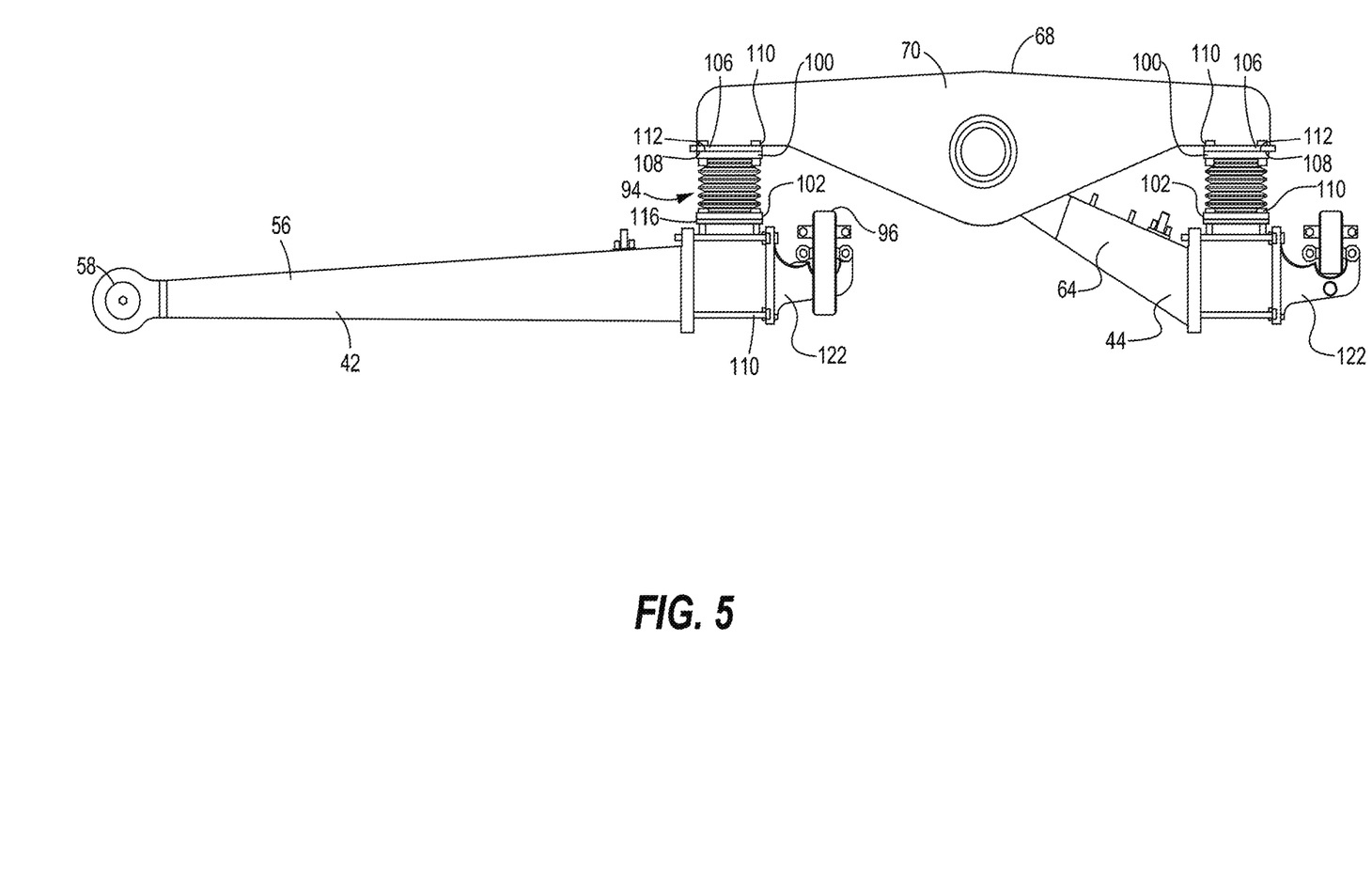
FIG. 5 is a side view of a portion of a rear chassis system constructed in accordance with an embodiment of the present invention.
Figure 6:
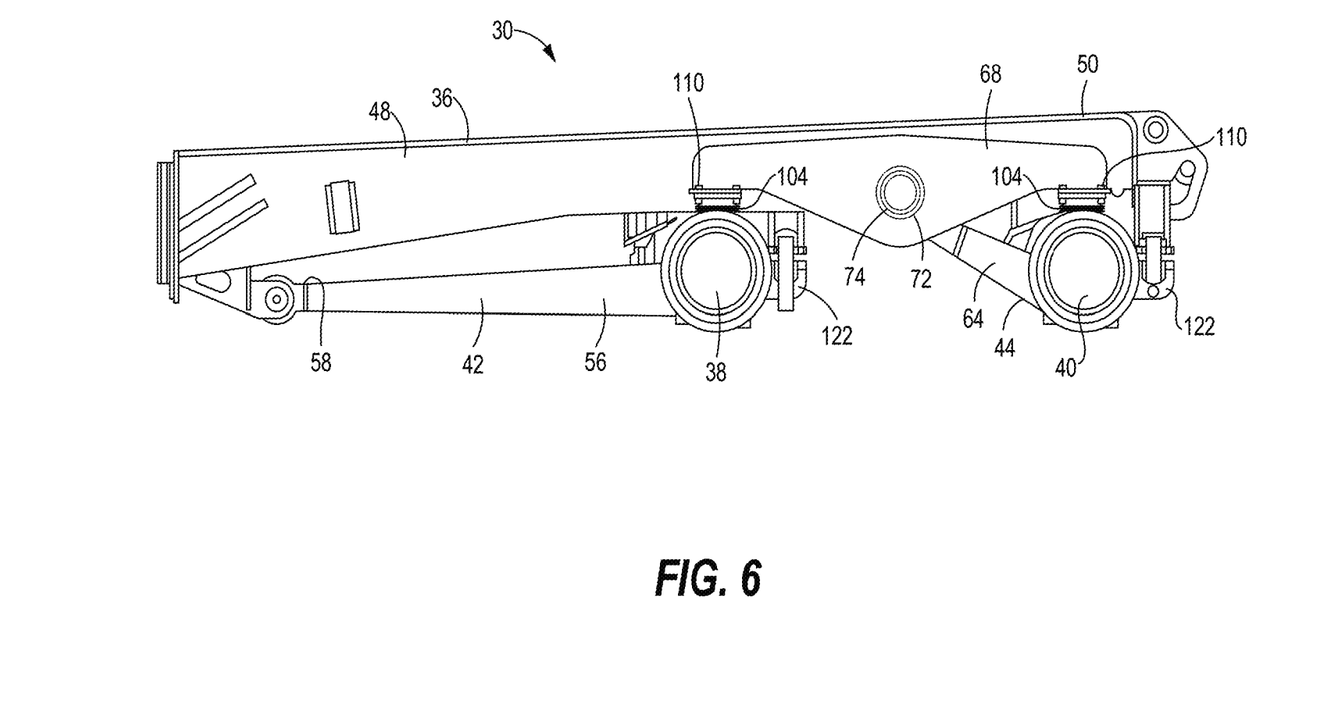
FIG. 6 is a side view of a portion of a rear chassis system constructed in accordance with an embodiment of the present invention.

Referring now to FIGS. 5 and 6, with continued reference to FIG. 2, the first equalizing beam 66 and the second equalizing beam 68 may be coupled to the front rear axle 38 and the back rear axle 40 via a plurality of resilient suspension mounts 94. More specifically, each equalizing beam 66, 68 may include a pair of mounting plates 106 formed at opposing ends of the equalizing beam. For example, as illustrated in FIG. 5, one mounting plate 106 may be aligned with the front rear axle 38, and one mounting plate 106 may be aligned with the back rear axle 40.

Each suspension mount 94 may include a top plate 100 having a top mounting surface 112 and a bottom plate 102 having a bottom mounting surface 114, with a resilient material 104 provided between the top and bottom plates. A spacer plate 116 may be coupled to the bottom mounting surface 114 of each bottom plate 102. Each mounting plate 106, spacer plate 116, top plate 100 and bottom plate 102 may be flat or planar and may have a square, rectangular, circular, or other regular or irregular-shaped perimeter. To fix each suspension mount 94 to its corresponding equalizing beam 66, 68, each top plate 100 may be fastened to one of the mounting plates 106. Similarly, each bottom plate 102 and its corresponding spacer plate 116 may be fixed to one of the front or back rear axles 38, 40 using a plurality of fasteners 110. Each of the mounting plate 106, spacer plate 116, top plate 100, and bottom plate 102 may also include a plurality of bore holes (not shown) dimensioned to receive a plurality of fasteners 110, such as bolts or screws. Consequently, each mounting plate 106, spacer plate 116, top plate 100 and bottom plate 102 may have a correlating number and arrangement of bore holes. Other attachment methods known to persons of ordinary skill in the art may also be used.

In the arrangement described, the bearing aperture 61 (FIG. 4), the equalizing beam apertures 72, the bushings 74, and the top plate 100 of each suspension mount 94 may be coplanar, or substantially coplanar, while the work machine is in a neutral state (i.e. on flat ground). The coplanar alignment may also extend through the exterior apertures 90 and the interior apertures 87, as shown in FIGS. 1-6 herein, however, the exact arrangement, position, size and shape of the exterior and interior apertures may vary.

The resilient material 104 may be formed from any suitable resilient material, for instance, an elastomeric material. Such materials typically bulge when subjected to compressive loads and neck down when subjected to tension loads. The resilient material 104 may be molded to, bonded with an adhesive to, or otherwise attached to the top and bottom plates 100, 102 in order to more efficiently transmit loads between the top and bottom plates. The resilient material 104 may also include a plurality of stiffening elements (not shown) embedded in the resilient material, as well as a rigid center link (not shown) to further limit tensile loading on the elastomeric material and, in some cases, compressive loading.

With continued reference to FIGS. 5 and 6, the rear chassis system 30 also includes at least one panhard rod bracket 122 associated with each rear axle 38, 40. The panhard rod bracket 122 is configured to accept a panhard rod (not shown) that may attach to one of the chassis frame 36 longitudinal beams 48 in order to restrict lateral movement of each rear axle 38, 40 (FIG. 2) during operation of the work machine 10. Further, lateral translations experienced by the suspension mounts 94 may be significantly reduced by arranging a panhard rod bearing 96 to be coplanar, or substantially coplanar, with the bottom plate 102 of each suspension mount. Each panhard rod bracket is fixed to a corresponding suspension arm, and thereby coupled to one of the rear axles. With specific reference to FIG. 5, the panhard rod bracket 122 associated with the front suspension frame 42 is shown fixed to a corresponding second front arm 56 of the front suspension frame using a plurality of fasteners 110, such as bolts. In this arrangement, the panhard rod bracket 122, the front suspension frame 42, and the suspension mount 94, are fixed to the front rear axle 38 (FIGS. 2 and 6) while preserving the structural integrity of the front rear axle.

INDUSTRIAL APPLICABILITY

In practice, the teachings of the present disclosure may find applicability in many industries including, but not limited to, construction and earth moving equipment, as well as transportation vehicles. For example, the present disclosure may be beneficial to articulated vehicles such as, motor graders, loaders, and dump trucks, buses or trains, as well as to other types of vehicles, including commercial vehicles and the like. The present disclosure provides a rear chassis system with a coaxial and coplanar configuration that minimizes the relative translation between the mounting plates of the rearward suspension mounts during operation of the work machine.

In accordance with one embodiment of the present disclosure, the spindle cross member 52 defines the spindle axis 98 that extends laterally across the rear chassis system 30. The spindle axis 98 may parallel, or substantially parallel, the axle axes 118, 120 defined by the rigid axle shaft 46 associated with each rear axle 38, 40. Perpendicular to the spindle axis 98 and the axle axes 118, 120 are the equalizing beams 66, 68 that extend between the rear axles 38, 40. The equalizing beams 66, 68 and the bushings 74 are installed onto the end sections 78 of the spindle cross member 52, thereby aligning the equalizing beam apertures 72 and bushings with the spindle axis 98. The back bearing head 60, including the bearing aperture 61, is also pivotably fixed to the spindle cross member, so as to further align the bearing aperture with the spindle axis 98. During operation of the work machine 10, as the machine travels over uneven terrain, the axial alignment of the spindle cross member 52, the bushings 74, the equalizing beam apertures 72, and the bearing aperture 61 of the back bearing head 60 (along the spindle axis 98) forces the back rear axle 40 and equalizing beams 66, 68 to pivot on the same axis. This minimizes the relative fore-aft translation between the top and bottom plates 100, 102 of the suspension mounts 94 fixed to the back rear axle 40 during operation of the work machine 10.

Further, the top plates 100 of each of the suspension mounts 94 are fixed to the mounting plates 106 of the equalizing beams 66, 68 such that the top plates are coplanar with the spindle axis 98 and the component parts thereof, including, for example, the equalizing beam apertures 72 and the bearing aperture 61. During operation of the work machine 10, as the machine travels over uneven terrain, the coplanar alignment of the spindle axis 98 and its component parts with the top plates 100 of each suspension mount 94 minimizes fore-aft translations between the top and bottom plates 100, 102, thereby providing a corresponding increase in life of the suspension mounts.

While aspects of the present disclosure have been particularly shown and described with reference to the embodiments above, it will be understood by those skilled in the art that various additional embodiments may be contemplated by the modification of the disclosed machines, systems and assemblies without departing from the scope of what is disclosed. Such embodiments should be understood to fall within the scope of the present disclosure as determined based upon the claims and any equivalents thereof.

What is claimed is:

1. A rear chassis for a vehicle, the rear chassis including:
   a chassis frame including at least two longitudinal chassis members;
   a plurality of axles, including a front rear axle and a back rear axle;
   a suspension frame coupled to the back rear axle, the suspension frame including a bearing head having a bearing head aperture;
   a pair of equalizing beams extending between the front rear axle and the back rear axle, each equalizing beam including a bushing aperture; and
   a spindle cross member having a middle section and opposing end sections, the bearing head aperture, the bushing apertures, and the spindle end sections being coaxially aligned to define a spindle axis.

2. The rear chassis of claim 1, wherein the front rear axle includes a front rigid axle shaft that defines a first axle axis and the back rear axle includes a back rigid axle shaft that defines a second axle axis.

3. The rear chassis of claim 2, wherein the first axle axis, the second axle axis and the spindle axis are parallel.

4. The rear chassis of claim 1, wherein the middle section of the spindle cross member includes means for receiving the bearing head.

5. The rear chassis of claim 1, further including a plurality of suspension mounts, each suspension mount including a top plate, a bottom plate, and a resilient material extending between the top plate and the bottom plate.

6. The rear chassis of claim 5, wherein the top plate of each suspension mount is fastened to a bottom surface of one of the pair of equalizing beams, and the bottom plate of each suspension mount is fastened to one of the front rear axle and the back rear axle.

7. The rear chassis of claim 1, wherein each end section of the spindle cross member includes two conical bushings dimensioned to fit in one of the bushing apertures.

8. The rear chassis of claim 1, wherein the suspension frame is an a-frame including a plurality of frame arms, each frame arm having a first end proximate the bearing head and an opposite second end proximate the back rear axle, the first end of each frame arm being joined together at the bearing head, the second end of each frame arm being coupled to the back rear axle.

9. A rear chassis for a vehicle, the rear chassis including:
   a chassis frame including at least two longitudinal chassis members;
   a plurality of axles, including a front rear axle and a back rear axle;
   a suspension frame coupled to the back rear axle, the suspension frame including a bearing head having a bearing head aperture;
   a pair of equalizing beams extending between the front rear axle and the back rear axle, each equalizing beam including a bushing aperture;

a plurality of suspension mounts, each suspension mount including a top plate, a bottom plate, and a resilient material extending between the top plate and the bottom plate; and a spindle cross member having a middle section and opposing end sections, the bearing head aperture, the bushing apertures, the spindle end sections, and the top plate of each suspension mount being coplanar.

10. The rear chassis of claim 9, wherein the bearing head aperture, the bushing apertures, the spindle end sections, and the bushing apertures are coaxially aligned to define a spindle axis.

11. The rear chassis of claim 10, wherein the front rear axle includes a front rigid axle shaft that defines a first axle axis and the back rear axle includes a back rigid axle shaft that defines a second axle axis.

12. The rear chassis of claim 11, wherein the first axle axis, the second axle axis and the spindle axis are parallel.

13. The rear chassis of claim 9, wherein the middle section of the spindle cross member includes means for receiving the bearing head.

14. The rear chassis of claim 9, wherein the top plate of each suspension mount is fastened to a bottom surface of one of the pair of equalizing beams, and the bottom plate of each suspension mount is fastened to one of the front rear axle and the back rear axle.

15. The rear chassis of claim 9, wherein each end section of the spindle cross member includes two conical bushings dimensioned to fit in one of the bushing apertures.

16. The rear chassis of claim 9, wherein the suspension frame is an a-frame including a plurality of frame arms, each frame arm having a first end proximate the bearing head and an opposite second end proximate the back rear axle, the first end of each frame arm being joined together at the bearing head, the second end of each frame arm being coupled to the back rear axle.

17. A vehicle, the vehicle comprising:
an engine assembly supported by a front chassis, the engine assembly including an engine and an operator cab;
a trailer assembly supported by a rear chassis; and
an articulation joint to pivotably connect the front chassis and the rear chassis, the rear chassis including:
a front suspension frame coupled to a front rear axle, the front suspension frame including a front bearing head operatively coupled to the articulation joint;
a rear suspension frame coupled to a back rear axle, the rear suspension frame including a rear bearing head having a rear bearing head aperture;
a chassis frame including at least two longitudinal chassis members;
a spindle cross member having a middle section and opposing end sections;
a pair of equalizing beams extending between the front rear axle and the back rear axle, each equalizing beam including a bushing aperture; and
a plurality of suspension mounts, each suspension mount including a top plate, a bottom plate, and a resilient material extending between the top plate and the bottom plate, wherein the rear bearing head aperture, the bushing apertures, and the spindle end sections are coaxially aligned to define a spindle axis, and wherein the rear bearing head aperture, the bushing apertures, the spindle end sections, and the top plate of each suspension mount are coplanar.

18. The vehicle of claim 17, wherein the top plate of each suspension mount is fastened to a bottom surface of one of the pair of equalizing beams, and the bottom plate of each suspension mount is fastened to one of the front rear axle and the back rear axle.

19. The vehicle of claim 17, further including a panhard rod bearing, the panhard rod bearing being coplanar with the bottom plate of each suspension mount.

20. The vehicle of claim 19, wherein each longitudinal chassis member includes a pair of chassis apertures, each end section of the spindle cross member being installed in one of the pairs of apertures.

* * * * *